F. L. SESSIONS.
CABLE REELING MECHANISM.
APPLICATION FILED MAY 12, 1911.
1,135,468.
Patented Apr. 13, 1915.
2 SHEETS—SHEET 1.
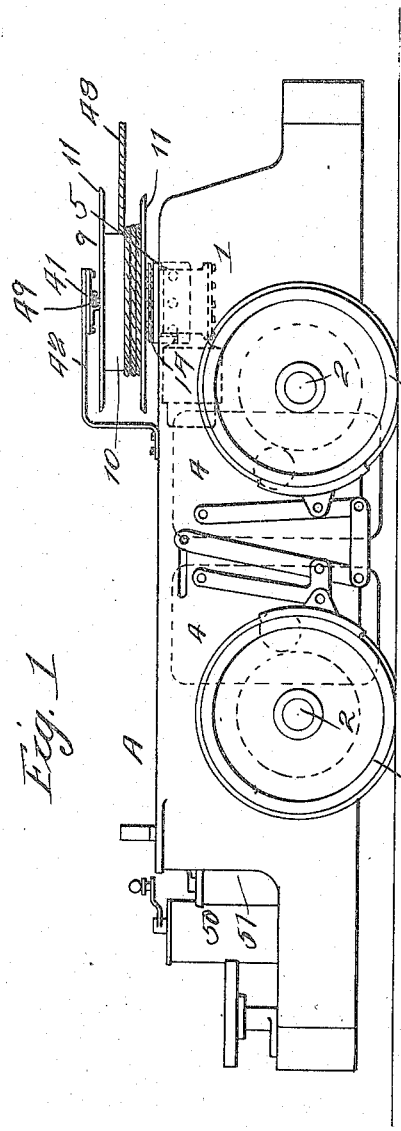
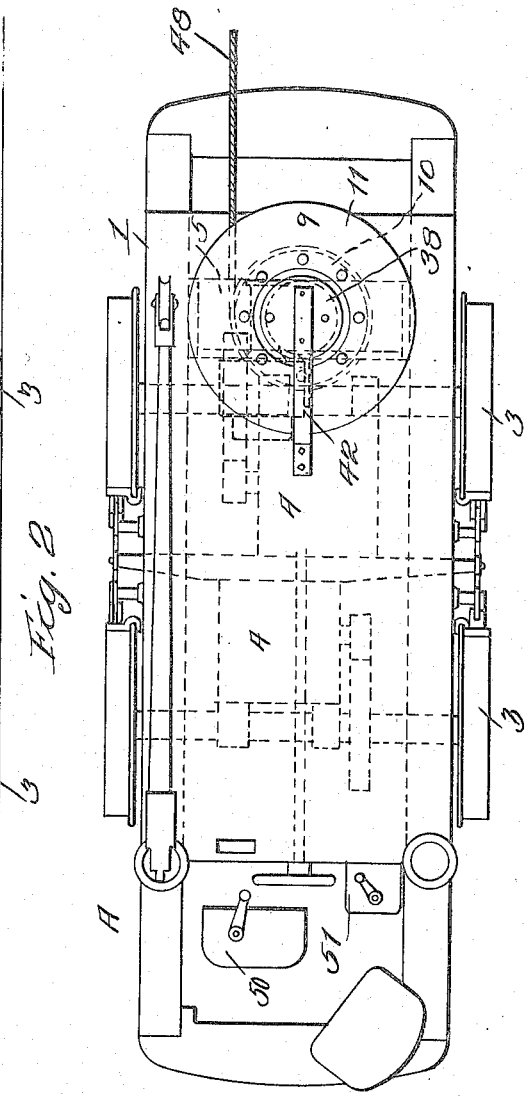
Witnesses
Inventor
Frank L. Sessions
By H. T. Bliss
Attorney

F. L. SESSIONS.
CABLE REELING MECHANISM.
APPLICATION FILED MAY 12, 1911.

1,135,468.

Patented Apr. 13, 1915.

2 SHEETS—SHEET 2.

Witnesses
Inventor
Frank L. Sessions
By Stot & Bliss
Attorney

UNITED STATES PATENT OFFICE.

FRANK L. SESSIONS, OF COLUMBUS, OHIO, ASSIGNOR TO THE JEFFREY MANUFACTURING COMPANY, A CORPORATION OF OHIO.

CABLE-REELING MECHANISM.

1,135,468.    Specification of Letters Patent.    Patented Apr. 13, 1915.

Application filed May 12, 1911. Serial No. 626,657.

*To all whom it may concern:*

Be it known that I, FRANK L. SESSIONS, a citizen of the United States, residing at Columbus, in the county of Franklin and State of Ohio, have invented certain new and useful Improvements in Cable-Reeling Mechanisms, of which the following is a specification, reference being had therein to the accompanying drawing.

The general construction and mode of operation of electric locomotives having cable reeling mechanisms are now well known and understood. These locomotives are used principally in mines for collecting together into trains loaded mine cars from branch entries and from various rooms in which cutting operations are being carried on. The rooms and branch entries are provided with tracks, but not with current supply wires. Therefore, when it is desired to operate a locomotive in one of the branch entries or rooms the cable reeling mechanism is used to carry and to wind and unwind a conductor cable, the free end of which is secured to a stationary electric conductor, such as a trolley wire. In this way current is carried from the stationary electric conductor to the locomotive while it is operating over tracks in the branch entries and rooms.

The object of this invention is to provide an improved cable reel mechanism compact in form and simple in construction and operation, especially adapted for use with locomotives not originally designed for such operation.

Figure 3:
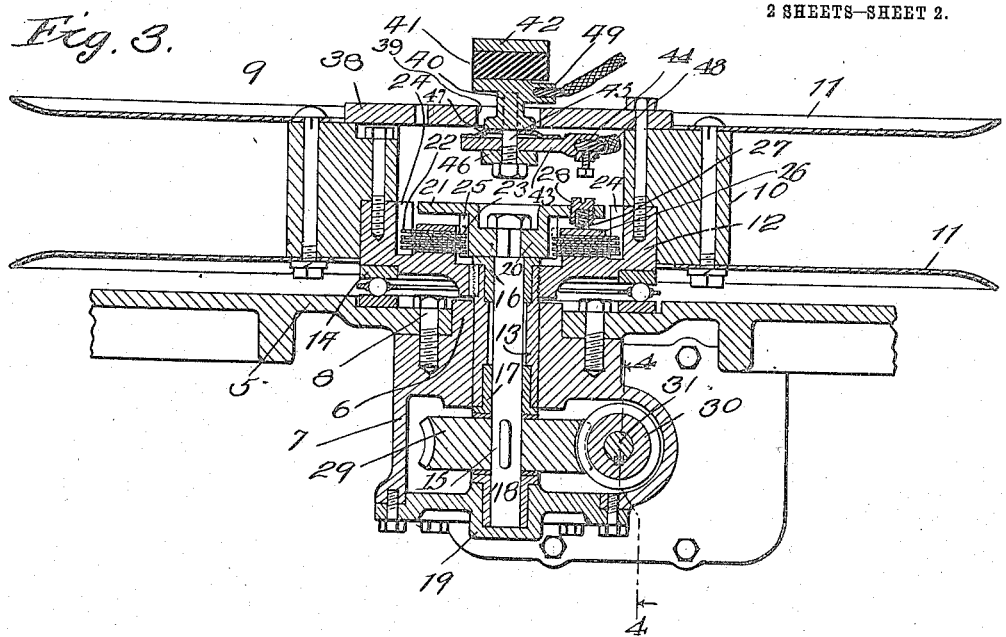
Figure 4:
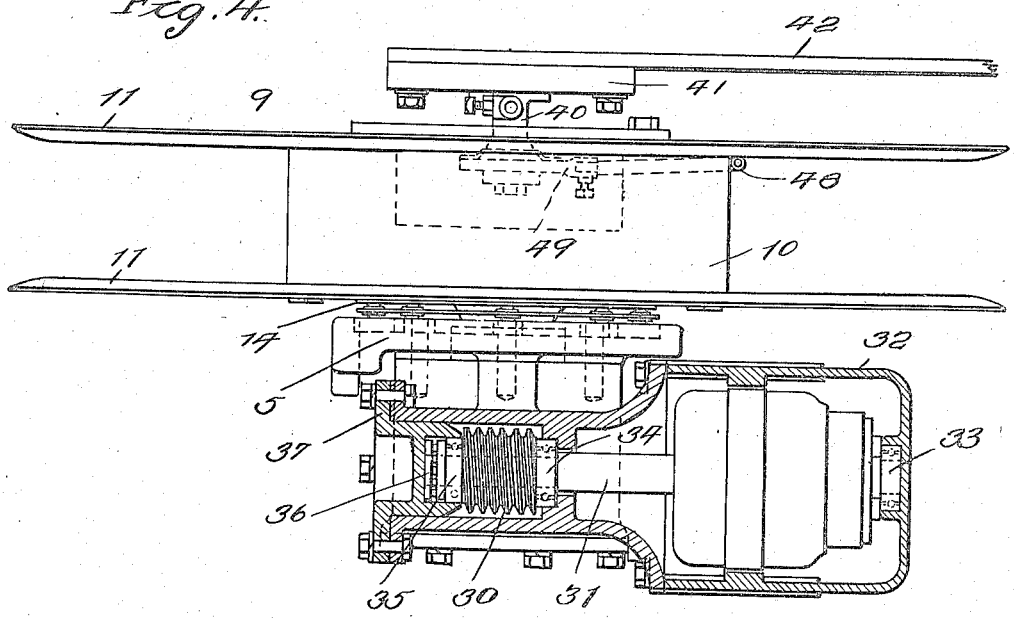

In the accompanying drawings, which show the embodiment of my invention which I now deem preferable, Figure 1 is a side view of a locomotive with my improved cable reel mechanism attached. Fig. 2 is a plan view of the locomotive and cable reel mechanism. Fig. 3 is a cross sectional elevation through the cable reel mechanism. Fig. 4 is a cross sectional elevation taken along the line 4—4 of Fig. 3.

Referring to the drawings, A represents as a whole an electric locomotive which is provided with the main frame 1, the axles 2, 2, the track wheels 3, 3, and the driving motors 4, 4.

Near one end of the locomotive there is provided a cross-bar or support 5 which extends transversely between the two sides of the frame 1. At or near the center of the cross-bar 5 there is a circular aperture through which extends a flange or collar 6 of the bearing and motor supporting bracket 7. This bracket is secured to the bottom of the cross-bar by suitable means, such as the bolts 8, 8.

9 represents as a whole the cable reel which is mounted to rotate on a vertical axis. The reel comprises the hollow drum 10, the top and bottom cable retaining flanges 11, 11, and the hub 12 to which the lower part of the drum is secured.

13 is a depending bearing sleeve or quill connected at its upper end with the hub 12 and rotatably mounted below the hub in a suitable bearing aperture in the upper part of the bracket 7. The reel is supported by the ball bearing 14, the upper race of which is secured to the hub 12 and the lower race of which lies in the depression in the upper surface of the cross-bar 5.

15 is a vertical shaft rotatably mounted near its upper end and near its center in bearings 16 and 17 in the sleeve 13 and at its lower end in a bearing 18 mounted in a cap 19 which is secured to and which closes the lower end of the bracket 7. Secured to the upper end of the shaft 15 is a clutch element 20 at the upper part of which is a horizontal flange 21. Between this flange 21 and the upper horizontal surface of the hub 12 are mounted two inter-engaging series of clutch disks 22 and 23. The disks of one series are secured to the hub by means of teeth or keys 24, 24, and the disks of the other series are secured to the clutch element 20 by means of teeth or keys 25, 25. Above the disks is a plate 26 which is forced against the upper disk by means of the springs 27 and which serves to press all of the disks into engagement with each other. The tension of the springs may be adjusted by means of the screws 28. It will be observed that by means of this clutch a limited amount of power may be transmitted from the shaft 15 to drive the reel.

To the lower part of this shaft 15, between the bearings 17 and 18, there is secured the worm wheel 29 which meshes with the worm 30 mounted on the horizontal motor shaft 31.

32 represents the motor which is mounted upon the bracket 7.

Three ball journal bearings 33, 34, 35 are preferably provided for the shaft 31, one being located at the motor end, one at one side of the worm and the third at the other side of the worm. At the end of the shaft, remote from the motor, there is preferably provided a ball thrust bearing 36. The two bearings 35 and 36 are preferably supported by means of a head 37 secured to the bracket 7 and having a projection extending into the worm pocket.

I provide above the reel a suitable electric conductor and with this conductor there is associated a suitable conductor device for connecting the same conductor with the cable on the reel.

38 is a plate covering the central opening in the drum 10. This plate is provided with a central aperture 39 through which there extends a depending bracket 40 secured to the insulating block 41. The insulating block 41 is mounted upon the longitudinally extending arm 42 which in turn is mounted on the locomotive.

43 is a plate provided with a wire socket 44 and rotatably mounted upon the pivot bolt 45 secured to the bracket 40. A washer 46 is interposed between the plate 43 and the nut at the lower end of the bolt. A spring 47 interposed between the plate and the bracket serves to insure good electric contact at all times. The end of the cable 48 is secured in the socket 44 on the plate 43 and serves to cause the rotation of the plate with the reel. The conductor for the motors is secured in a socket 49 on the upper part of the bracket 40.

Electric connections are provided from the trolley wheel or from the cable through the main controller 50 and through the motors 4, 4. A connection is also provided through the reel motor controller 51 and through the reel motor so that when the controller 51 is in "on" position the motor 32 will be continuously energized for rotation to tend to turn the reel in the winding direction.

Assuming that the locomotive is in position with the cable unwound from the reel and is ready to start toward the fixed conductor, then the motor 32 is energized and transmits power through the worm 30, the wheel 29, the shaft 15 and the disk clutch to turn the reel in the direction to wind the cable. The power of the motor is sufficient to maintain a tension in the cable for all locomotive speeds. When it is desired to operate the locomotive in the other direction, then the current may, if desired, be cut off from the motor 32 and the cable allowed to unwind against the resistance of the disk clutch, which serves as a friction brake. The worm wheel engaging the worm serves to prevent the shaft from rotating in the reverse direction. For short movements of the locomotive in forward and reverse directions it is not necessary to deënergize the motor 32 and in fact it will ordinarily be found advantageous to leave it in operation continuously. In this way a continuous torque is applied to the reel, whether the locomotive be moving in one direction, whether it be standing still, or whether it be moving in the other direction.

It will be observed that the mechanism which I have provided by my invention is simple and entirely self-contained. By the provision of a suitable cross-bar 5 the mechanism may be attached to any locomotive, even though not originally intended for cable reel operation.

By providing a conducting device such as that shown and described, above the reel and supported independently thereof I am enabled to make the reel and the driving and supporting mechanism therefor more simple and compact than would otherwise be possible. By leaving the space below the reel entirely free from electric conductors I am enabled to make use of this space for the supporting and driving elements and to arrange these elements in the most compact manner. The whole mechanism including the reel and the supporting and driving elements therefor is self-contained and can be, as a unit, applied to or removed from a locomotive. The electric conducting device together with its support can be applied to or removed from the locomotive separately and any failure to secure exact alinement of the axis of the conducting device with the axis of the reel will be compensated for by the flexible connection provided at the end of the cable.

What I claim is:

1. In a cable reeling mechanism for electric locomotives, the combination of a supporting framework, a rotatable cable reel engaging at one end with the said framework and entirely supported thereby at the said end, the other end of the reel being entirely exposed and without direct support, mechanism at the first said end of the reel for rotating it, a cable adapted to be wound upon the reel, a current conductor mounted at the exposed end of the reel independently thereof and of the said supporting framework, and means rotatable with the reel and mounted independently thereof for electrically connecting the said conductor with the cable.

2. In a cable reeling mechanism for electric locomotives, the combination of a supporting framework, a vertical rotatable cable reel engaging at its lower end with the said framework and entirely supported thereby at the said end, the upper end of the reel being entirely exposed and without direct support, mechanism beneath the reel for rotating it, a cable adapted to be wound upon the reel, a current conductor mounted above the reel independently thereof and of the said supporting framework, and means rotatable with the reel and mounted independently thereof for electrically connecting the said conductor with the cable.

3. In a cable reeling mechanism for electric locomotives, the combination of a supporting framework, a rotatable cable reel engaging at one end with the said framework and entirely supported thereby at the said end, the other end of the reel being entirely exposed and without direct support, mechanism at the first said end of the reel for rotating it, a cable adapted to be wound upon the reel, a current conducting device mounted at the exposed end of the reel independently thereof and of the said supporting framework, the said conducting device comprising a non-rotatable part and a part rotatable substantially coaxially with the reel, and means for mechanically and electrically connecting the cable and the said rotatable part.

4. In a cable reeling mechanism for electric locomotives, the combination of a supporting framework, a vertical rotatable cable reel engaging at its lower end with the said framework and entirely supported thereby at the said end, the upper end of the heel being entirely exposed and without direct support, mechanism beneath the reel for rotating it, a cable adapted to be wound upon the reel, a current conducting device mounted above the reel independently thereof and of the said supporting framework, the said conducting device comprising a non-rotatable part and a part rotatable substantially co-axially with the reel, and means for mechanically and electrically connecting the cable and the said rotatable part.

5. In a cable reeling mechanism for electric locomotives, the combination of a supporting framework, a vertical rotatable cable reel engaging at its lower end with the said framework and entirely supported thereby at the said end, the upper end of the reel being entirely exposed and without direct support, mechanism beneath the reel for rotating it, a cable adapted to be wound upon the reel, an arm supported at one side of the reel and extending over the reel without rigid mechanical connection therewith, a current conducting device mounted entirely on the arm and comprising a non-rotatable part and a part rotatable substantially co-axially with the reel, and means for mechanically and electrically connecting the cable and the said rotatable part.

In testimony whereof I affix my signature, in presence of two witnesses.

FRANK L. SESSIONS.

Witnesses:
V. D. LEVIN,
DUDLEY T. FISHER.